United States Patent

Inoue et al.

[11] Patent Number: 6,128,256
[45] Date of Patent: Oct. 3, 2000

[54] APPARATUS AND METHOD FOR POSITIONING AN OPTICAL HEAD OVER A DISK HAVING PRE-GROUPS WITH ENCODED ADDRESS INFORMATION

[75] Inventors: Koji Inoue, Chiba; Kensuke Fujimoto; Masahiro Shigenobu, both of Kanagawa, all of Japan

[73] Assignee: Sony Corporation, Tokyo, Japan

[21] Appl. No.: 09/313,491

[22] Filed: May 17, 1999

Related U.S. Application Data

[62] Division of application No. 08/954,253, Oct. 20, 1997, Pat. No. 5,959,947.

[30] Foreign Application Priority Data

Oct. 28, 1996 [JP] Japan ............................ P08-302553

[51] Int. Cl.[7] .................................................. G11B 17/22
[52] U.S. Cl. ........................................................ 369/32
[58] Field of Search ............................ 369/32, 44.28, 369/44.27, 44.26, 275.3, 58, 44.34, 44.35, 33

[56] References Cited

U.S. PATENT DOCUMENTS

| 5,247,498 | 9/1993 | Takekoshi et al. | 369/32 |
|---|---|---|---|
| 5,396,477 | 3/1995 | Matsumoto et al. | 369/44.28 |
| 5,532,988 | 7/1996 | Yokogama | 369/44.28 |
| 5,872,750 | 2/1999 | Satoh | 369/32 |
| 5,881,032 | 3/1999 | Ito et al. | 369/32 |

*Primary Examiner*—Tan Dinh
*Attorney, Agent, or Firm*—Limbach & Limbach L.L.P.

[57] ABSTRACT

An apparatus and method are provided for locating a desired track on a disk shaped recording medium. The disk has a first pre-group and a second pre-group. At least one of the pre-groups has encoded address information shared by at least one track on the inner side of the pre-group, and shared by at least one track on an outer side of the pre-group. A desired track is located based on changes in address information detected during or after a track jump.

18 Claims, 7 Drawing Sheets

INFORMATION RECORDING SURFACE

APPARATUS AND METHOD FOR POSITIONING AN OPTICAL HEAD OVER A DISK HAVING PRE-GROUPS WITH ENCODED ADDRESS INFORMATION

This application is a Division of Ser. No. 08/954,253 filed Oct. 20, 1997, U.S. Pat. No. 5,959,947.

BACKGROUND OF THE INVENTION

1. Field of the Invention

The present invention relates to an optical disk device, an optical disk track identification method and a method for accessing an optical disk as for instance applicable to an optical disk unit. This invention utilizes a simple configuration to access a specific track by means of a track identification method based on changes in address information from a specified number of track jumps.

2. Description of Related Art

In the method of an optical disk device of the conventional art, address information is held in common on adjacent tracks, allowing tracks to be formed close together and the recording density to be improved.

Figure 7:
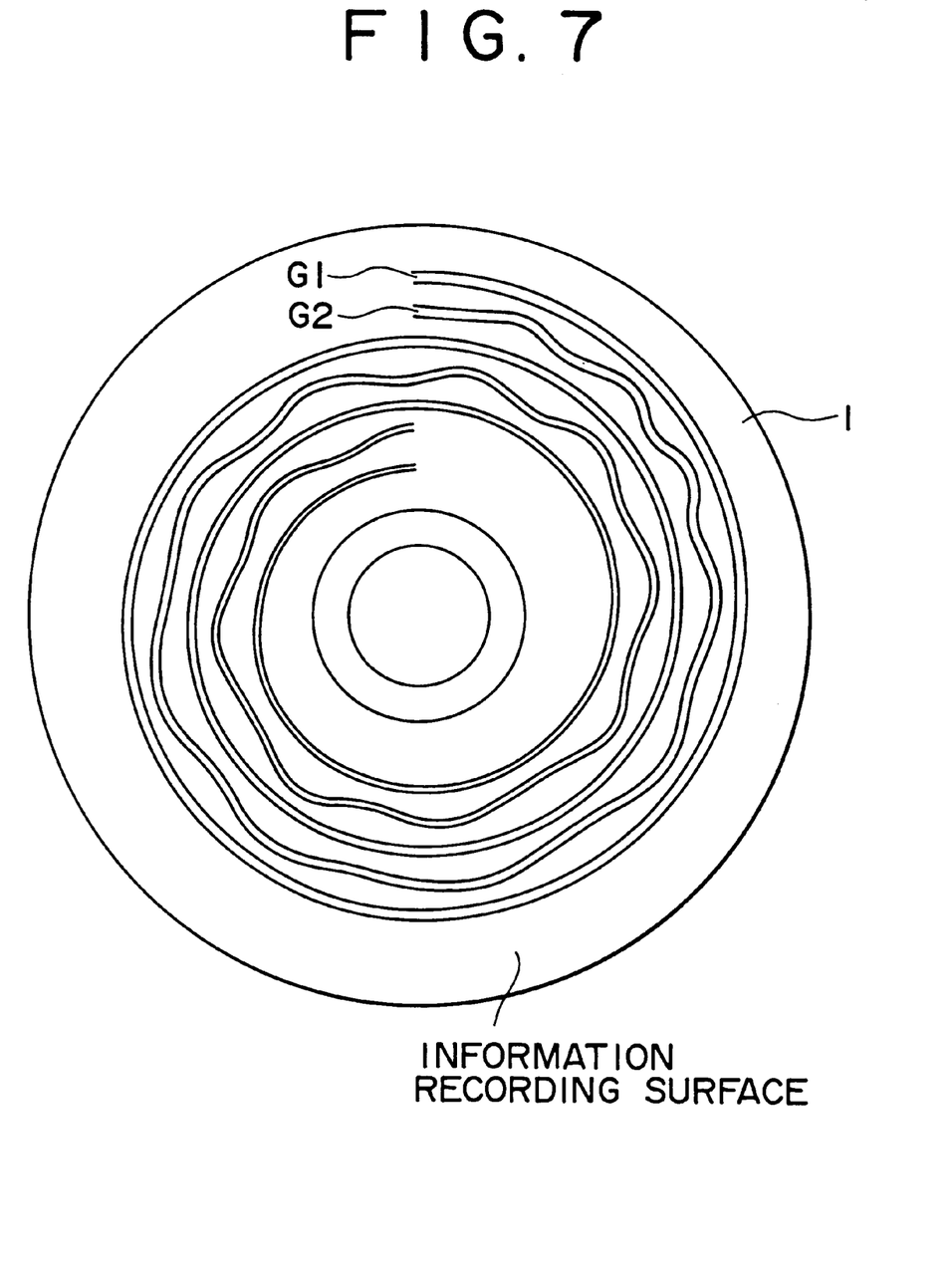
FIG. 7 is a flat view showing the magneto-optic disc.

An optical disk of this type is shown by a plan view for an optical magnetic disk in FIG. 7. An magneto-optic disc 1 is formed with two pre-groups G1 and G2 in a helical shape on the information recording surface. The pre-groups with the names G1 and G2 respectively form laser beam guide grooves. These laser beam grooves allow assigning tracks respectively to the pre-groups G1 and G2 or assigning tracks respectively between the lands of the continuous pre-groups G1 and G2 for thermo-electric recording of the desired data.

Of the two pre-groups G1 and G2, the pre-group G2 is formed to oscillate and the frequency of this oscillation is made to shift in compliance with the address information from a specified center frequency. This center frequency shift allows one piece of address information to be assigned to the No. 1 and No. 2 tracks corresponding to the two pre-groups G1 and G2 and this one piece of address information is held in common by two tracks.

When the pre-groups oscillate and the track density of the recorded address information is improved, cross talk which occurs across adjacent tracks is difficult to avoid and replaying of the correct address information becomes difficult. In contrast, if one piece of address information is held in common by two tracks, then effects of cross talk from adjacent tracks can be effectively prevented and the correct address information can be replayed. This common holding of information therefore permits improved track density and reliable access of the desired track.

However, when utilizing an optical pickup to access the desired track on this type of optical disk which shares one piece of information among two tracks, a track identification means is necessary to access one of these tracks.

To provide such a track identification means, methods were proposed such as the three-spot method in which along with issue of a laser beam, the return of the laser beam was received and address information detected from the pre-group on either the inner circumference or the outer circumference.

However, this method had a problem in that the overall or partial structure of the mechanism for identifying the track was too complex.

SUMMARY OF THE INVENTION

In consideration of the above mentioned problems it is therefore an object of this invention to provide an optical disk unit, an optical disk track identification method and an optical disk access method having a simple structure to seek the desired track, in optical disks sharing one piece of address information on two tracks.

To resolve the aforementioned problems this invention comprises a means to identify the track before a track jump or the track after a track jump based on the changes in the address information detected after jumping only a specific number of tracks, by utilizing a track detection means applicable to an optical disk unit or an optical disk track identification method.

Further, the track after track jump is identified by performing track jump in the vicinity of the target track just for a specified number of tracks and identifying the track after track jump by means of changes in the address information detected from the jump.

In address information detected after track jump is performed for just a specific number of tracks, the track information will vary according to the track before track jump or the track after track jump. The track before track jump or the track after track jump can thus be identified based on changes in the track information. Further, the number of tracks to the target track can be easily detected in the vicinity of the target track.

DETAILED DESCRIPTION OF THE PREFERRED EMBODIMENTS

Hereafter, a detailed description of the embodiment of this invention will be given while referring to the drawings.

Figure 2:
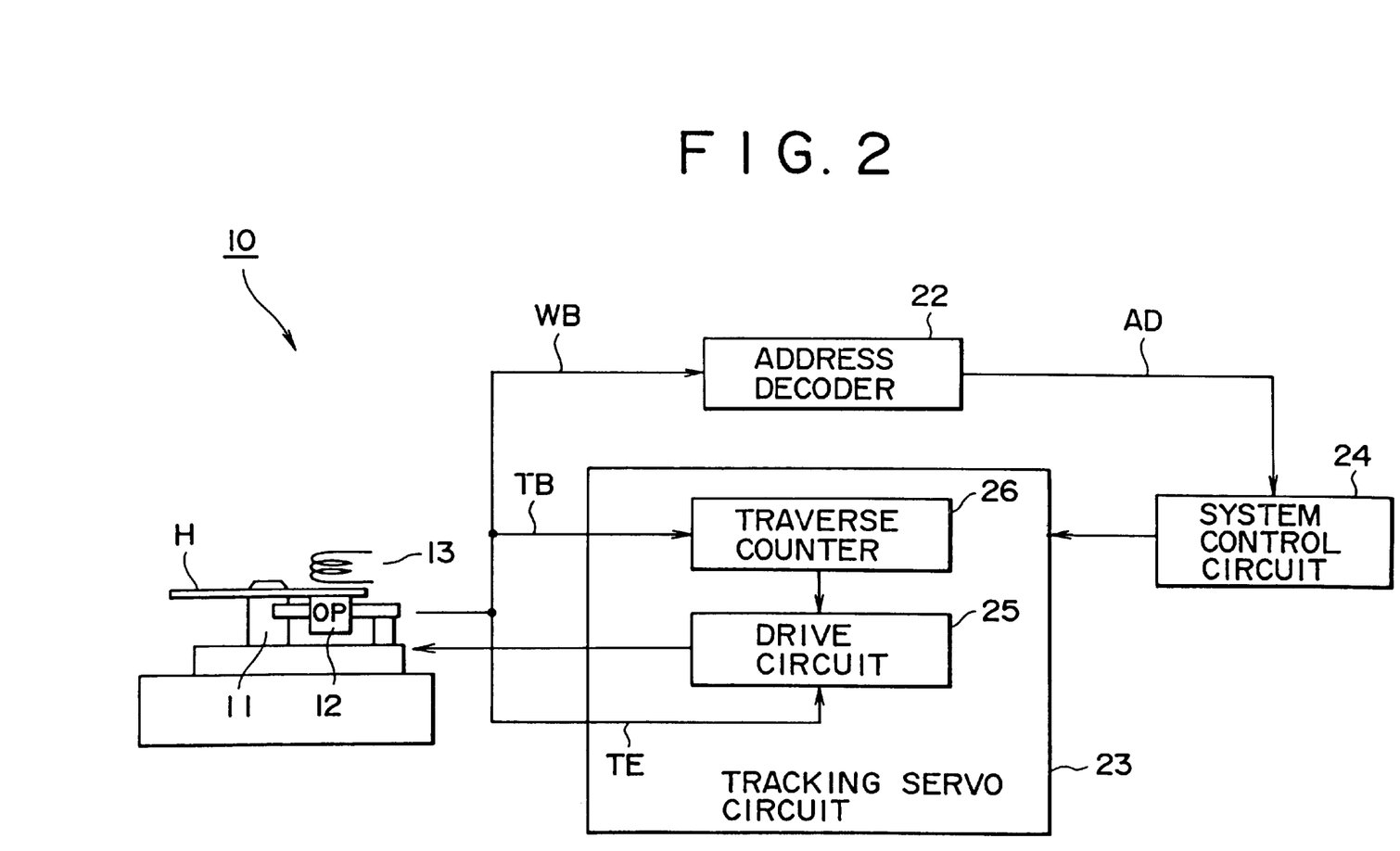
FIG. 2 is a block diagram showing the overall structure of the optical disk device.

FIG. 2 is a block diagram showing the optical disk device of the embodiment of this invention. An optical disk device 10 records and plays back the desired data by accessing the magneto-optic disc 1. This magneto-optic disc 1 has two pre-groups G1 and G2 formed in a helical shape on the information record surface and address information is assigned to the pre-group G2 on the inner circumferential side. In other words, the pre-group G2 on the inner circumference is formed to oscillate and the frequency of this oscillation is made to shift in compliance with the address information from a specified center frequency.

Further, the groups 1 and 2 on this optical disk H are formed within a narrow range and lands between these groups 1 and 2 are assigned to respective tracks. In this way, address information of the group G2 from the magneto-optic disc 1 is commonly shared on the two tracks enclosing this group G2. Hereafter, the track on the inner circumferential side for group G2 shall be called the A track and the track on the outer circumferential side shall be called the B track.

The optical disk device 10 of the magneto-optic disc 1 is clamped by a spindle motor 11 and driven at a specified speed. Further, the optical disk device 10 has an optical pickup 12 and a modulation coil 13 enclosing the magneto-optic disc 1 on both sides. This optical pickup 12 and the modulation coil 13 can move radially along the magneto-optic disc 1 by means of a specified thread mechanism. This thread mechanism therefore is driven and allows track jump to be performed.

This optical pickup 12 beams a laser beam onto the information recording surface of the magneto-optic disc 1 by means of the specified polarized surface of the object lens and generates the various signals required by the optical disk device by means of receiving the returning laser beam light onto a specified light receiving element. The optical pickup 12 also raises the laser beam intensity at intervals during recording, and the optical disk device 10 applies a modulated magnetic field to the laser beam position by means of the modulation coil 13. This process allows recording the desired data in a method suitable for a thermal magnetic recording method.

Figure 3:
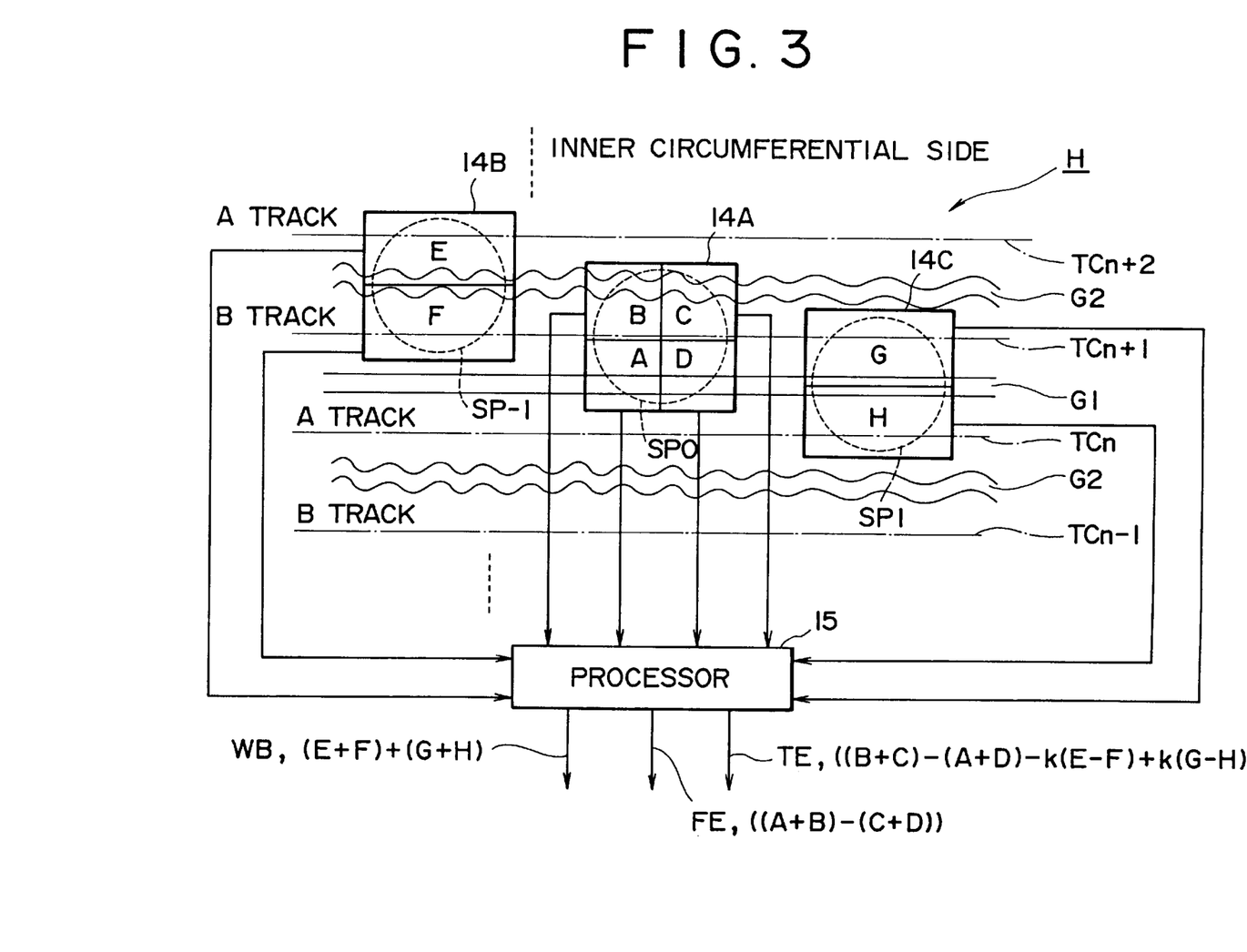
FIG. 3 is a simplified diagram of the optical pickup for the optical disk device of FIG. 2.

Restated, the array of light receiving elements of the optical pickup 12 in FIG. 3 are shown versus the information recording surface of the magneto-optic disc 1 in the diagram. The symbols $TCn+2$, $TCn+1$, $TCn$, $TCn-1$ indicate the respective track centers of tracks $Tn+2$, $Tn+1$, $Tn$, and $Tn-1$.

The optical pickup 12 sends a laser beam from the specified polarized surface from the laser diode to generate a diffraction light on the order of 0, −1 or +1 from the diffraction grating. This diffraction light is further concentrated by the object lens onto the information recording surface of the magneto-optical disk 1 and the returning light received as various diffracted light. When the diffracted light on the order of 0 is correctly scanning the track center, the optical pickup 12 is set to beam the respective diffraction light on the order of −1 and +1, onto the pre-groups of the inner and outer circumferential sides of the track center. This returning light on the order of 0, −1 or +1 is received respectively by the No. 1, No. 2 and No. 3 light receiving elements 14A, 14B and 14C.

Here, the No. 1 light receiver element 14A forms a segmented light receiving surface made of dividing lines extending radially and peripherally on the magneto-optical disk 1 (symbol A–D for the divided light receiving surfaces, and the beam spot on these light receiving surfaces is shown with the symbol SP0) and outputs the signal from the light receiving surfaces. The No. 2 and No. 3 light receiver elements 14B and 14C respectively form segmented light receiving surfaces made of dividing lines extending radially and peripherally on the magneto-optical disk 1 (symbols E–H for the divided light receiving surfaces, and the beam spot on these light receiving surfaces is shown with the symbols SP-1 and SP1) and issue an output signal from these segmented light receiving surfaces.

The optical pickup 12 also performs current/voltage conversion of the output signal from the segment light receiving surfaces, in the processing circuit 15. Further, processing is performed of the output signal on which current/voltage conversion was performed, indicated by $(A+B)-(C-D)$ on the symbols assigned to the respective light receiving surfaces. A focus error signal FE which varies the signal level according to the amount of defocus is generated and then output. The symbols $(B+C)-(A+D)-k(E-F)+k(G-H)$ are indicated for the same purpose, and a tracking signal TE which changes the signal level in response to the amount of tracking error is generated and output. The symbol k used here expresses the proportional constant.

The optical pickup 12 further outputs a warble signal WB shown respectively by $(E+F)+(G+H)$. Here, the signal constituents shown by $(E+F)$ and $(G+H)$ form two warble signals whose signal level is changed according to the oscillation of the pre-group on the inner circumference and the pre-group on the outer circumference corresponding to their respective track centers. In this embodiment, these two warble signals are summed and then output.

In this embodiment, the address information is assigned to the pre-group G2 and address information is commonly shared by the A track of the inner circumferential side and and the B track of the outer circumferential side of this pre-group G2 so that when laser light on the order of 0 is scanning the track center $Tcn+1$ track of the B track, the No. 1 warble signal obtained from light received by optical receiver element 14B (which in turn received the light from the side beam [diffracted light on the order of −1] of the inner circumferential surface) is demodulated, and the B track address signal can thus be obtained. Also in this case, the process in which the No. 2 warble signal obtained from optical receiver element 14C which in turn received the light from the side beam (diffracted light on the order of +1) of the outer circumferential side makes detecting the pre-group oscillation difficult. The address information can however be detected from the warble signal WB which is the sum of the No. 1 and No. 2 warble signals.

Figure 4:
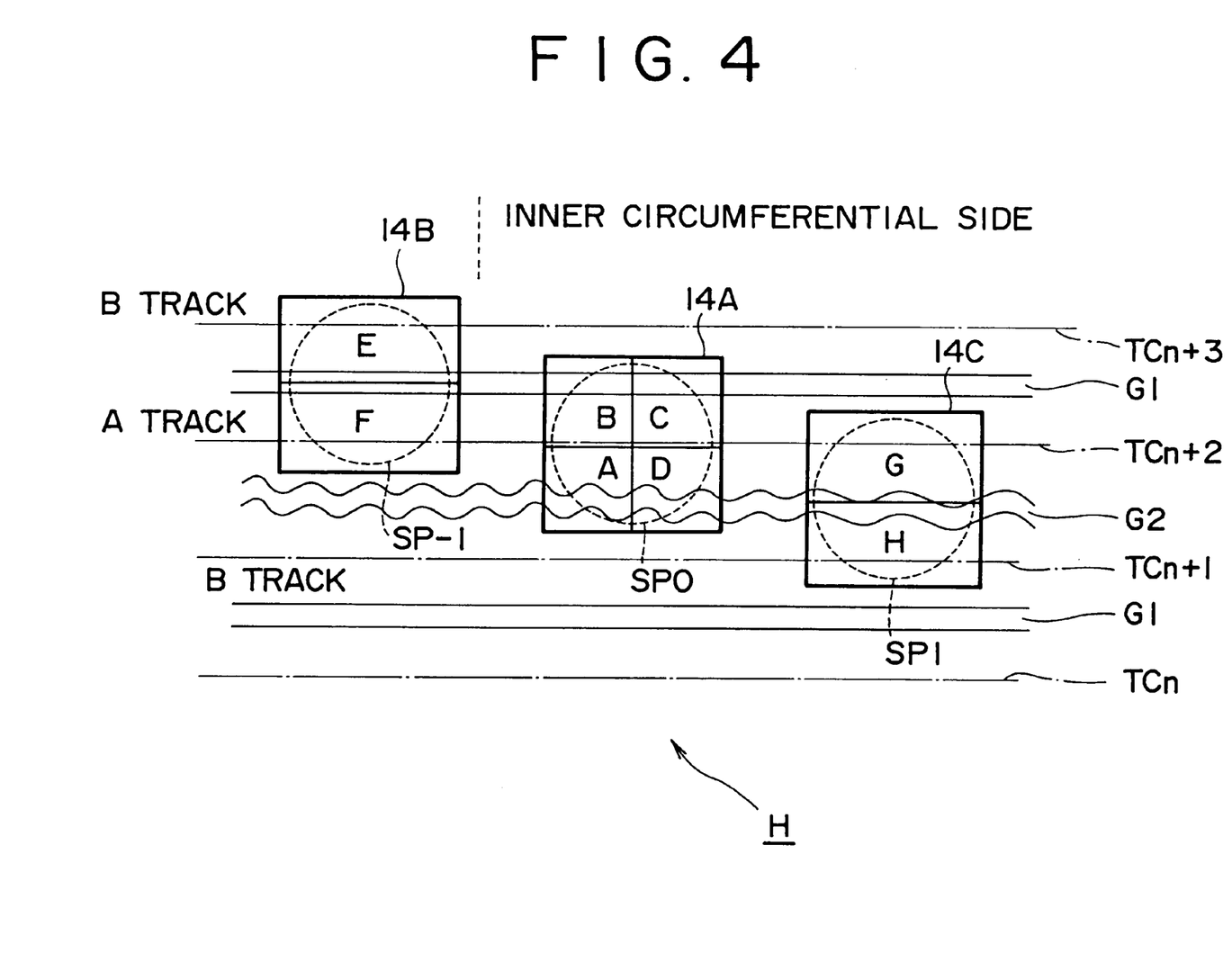
FIG. 4 is a simplified diagram showing the optical pickup when displaced one track compared with FIG. 3.

Further, when track jump from the A track external circumferential side to the B track is performed, the address information obtained from this demodulated WB signal is not changed, due to detection of the pre-group G2 oscillation with light receiver element 14B rather than 14C, however the address value is changed when track jump from the inner circumferential surface of the A track to the B track is performed. Also, even though the address value changes when track jump from the B track outer circumferential surface to the A track is performed, there is no change in the address value when track jump from the B track inner circumferential surface to the A track is performed.

Accordingly, a track jump from the B track to the A track can be identified when track jump to the external circumference was performed and address information changed after obtaining the demodulated warble signal. Likewise, a track jump from the A track to the B track can be identified when track jump to the external circumference was performed and address information was not changed.

In the same way, a track jump from the A track to the B track can be identified when track jump to the internal circumference was performed and address information changed. Conversely, when track jump to the internal circumference was performed and address information not changed, a track jump from the B track to the A track can be identified.

The optical disk device 10 thus can identify the A and B tracks based on changes in this address information. The optical pickup 12 utilizes an optical system not shown in the drawings to isolate the order of 0 returning light and separate out and receive the rectangular constituents of this order of 0 returning light on a separate polarized surface. This process allows the optical pickup 12 to generate a playback signal whose level changes according to changes in the returning light from the polarized surface. In the optical disk device 10, signal processing of this playback signal is performed for playback of the information recorded on the magneto-optic disc 1.

An address decoder 22 (FIG. 2) detects the frequency modulated warble WB signal and demodulates said signal.

This detection and demodulation process allows the address decoder 22 to playback and output the address information from the warble signal WB.

A tracking servo circuit 23 moves the object lens and the optical pickup 12 radially along the magneto-optic disc 1 while driven by a drive circuit 25 in order to maintain a tracking error signal TE at the specified signal level. The tracking servo circuit 23 can thus control tracking by the optical pickup 12.

Figure 5A:
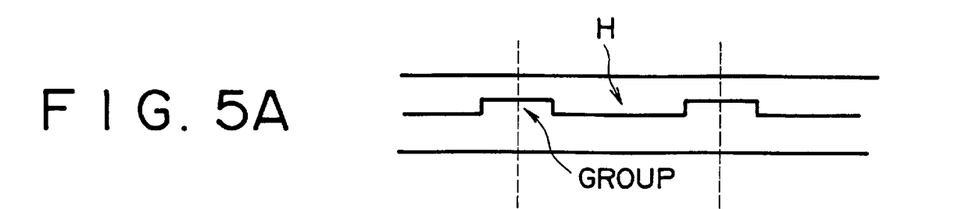
FIGS. 5A to 5C show a signal waveform diagram for describing the traverse signal.
Figure 5B:
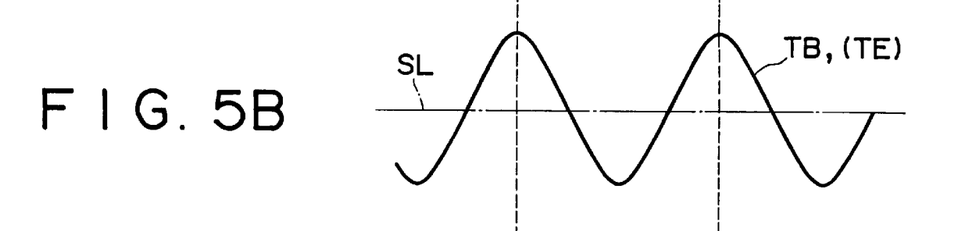
Figure 5C:
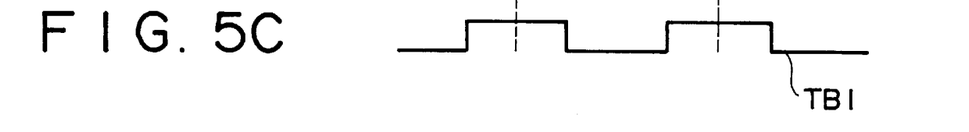

A system control circuit 24 regulates the tracking servo 23 during the track jump and after a track jump value N has been set in a traverse counter 26, the traverse signal TB is counted by means of this track jump value N setting. The signal level of the tracking error signal TE as shown in FIGS. 5A to 5C is varied according to the amount of tracking error so that during a track jump, the optical pickup 12 (in other words, the laser beam spot of the order 1) cuts across the perimeter of the track, changing the signal level (FIGS. 5A and 5B). This process allows the traverse counter 26 to input the tracking error signal TE as a traverse signal TB to perform binning and generate the binary signal TB1 (FIG. 5C) by means of the specified threshold value SL. Counting of this binarized signal TB1 is also performed.

A drive circuit 25 drives a thread mechanism so that the count value will be zero (0) which causes the optical pickup 12 to make a track jump. The drive circuit 25 is controlled by a system control circuit 24 to make a long distance track jump at this time by the thread mechanism which is driven by the control circuit 24 using a preset thread drive time instead of the count value from the traverse counter 26 for making the track jump.

In intermediate distance track jumps, a track jump number is selected corresponding to a profile selected by the system control circuit 24 from a plurality of preset profile types. The thread mechanism is then accelerated or decelerated according to this selected profile, based on the count value (count value in which the lower 2 bits are ignored) from a bus count 26. This process ends the track jump processing in a short time.

In short distance track jumps, a preset profile is utilized for track jumps equivalent to ten tracks and for even shorter distance track jumps, the thread mechanism is accelerated or decelerated based on the count value from the traverse counter 26. For even shorter distances, the thread mechanism is driven for one track jump by a preset drive signal.

The system control circuit 24 is a microcomputer for controlling overall operation of the optical disk device 10. The tracking servo circuit 23 is driven in compliance with the address information AD output from the address decoder 22 which causes the optical pickup 12 to seek the specified track. After seek, a record playback system not shown in the drawings is utilized to record the specified data on the magneto-optic disc 1 and playback this recorded data from the magneto-optic disc 1.

Figures 1, 1B:
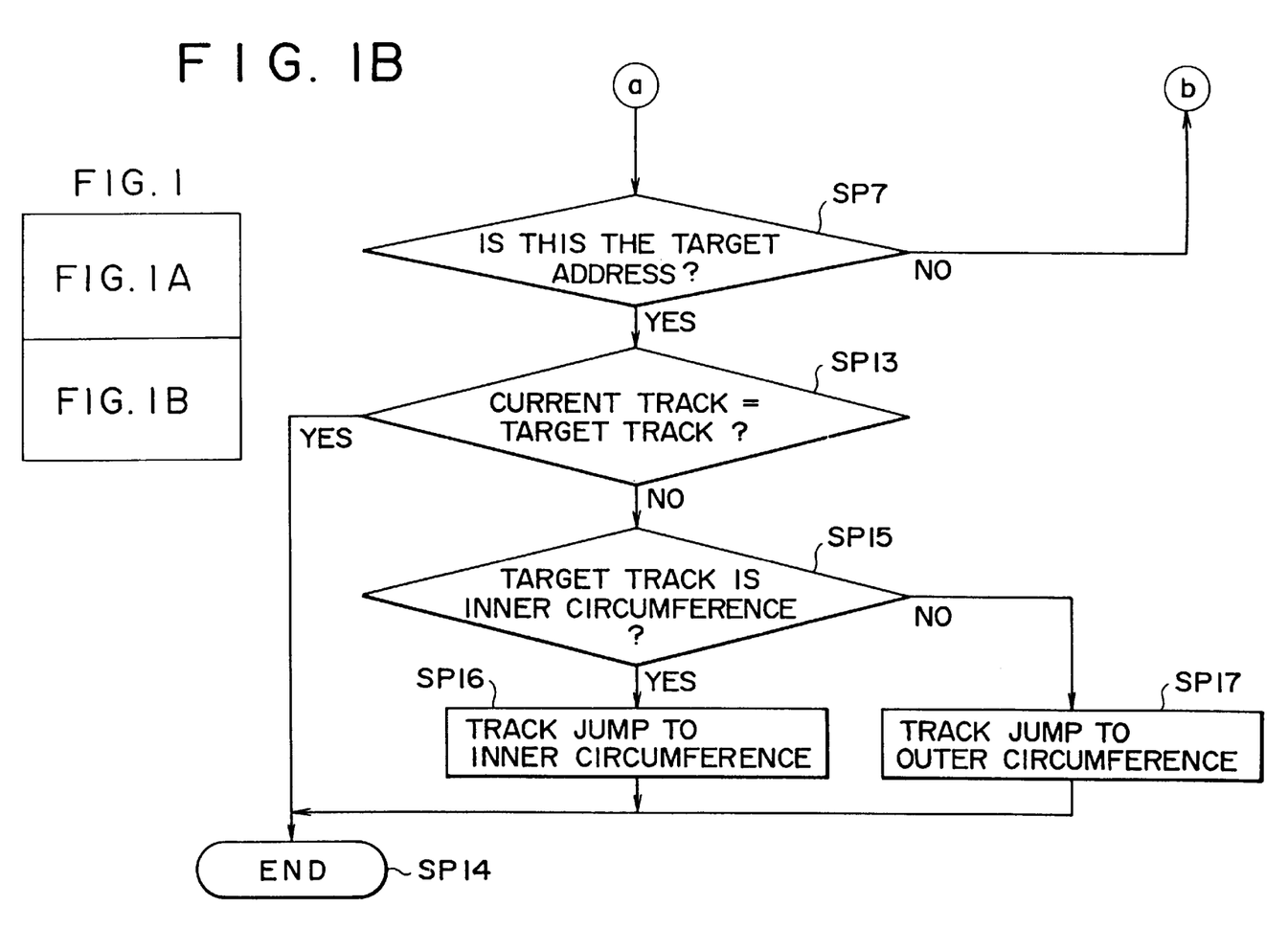
FIG. 1A and 1B are flowcharts showing the system control circuit processing for the optical disk device of the embodiment of this invention.
Figure 1A:
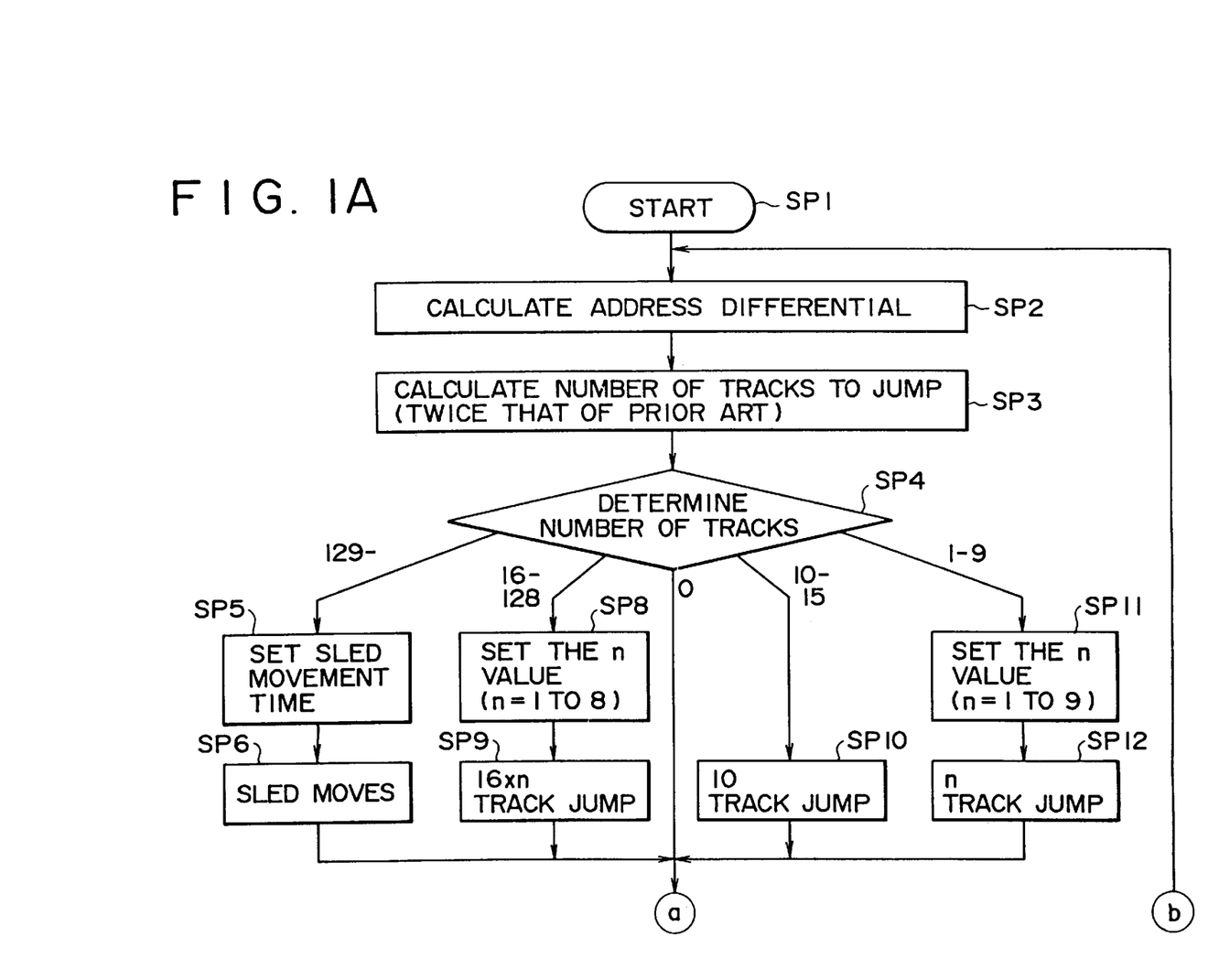

During seek, the system control circuit 24 drives the tracking servo circuit 23 by implementing the sequence shown in FIG. 1. In other words, the system control circuit 24 proceeds from step SP1 to step SP2 calculating the address difference between the address information of the target track and the currently accessed address information AD. Next, in step SP3, the number of tracks needed for track jump is calculated from this address difference. In this calculation, the number of tracks calculated from the address information on an magneto-optic disc formed with one pre-group in a helical shape, becomes as is, the number of tracks for the track jump. In this embodiment using the magneto-optic disc 1 however, the number of tracks used for the track jump is twice the number of tracks detected from the address information on the pair of pre-groups formed in a helical shape. Calculation of the number of tracks is performed by referring to the table described later which illustrates the relation of address to tracks.

The system control circuit 24 operation then proceeds to SP4 and determines the calculated number of tracks. At this point, when performing a track jump over a large distance and the number of tracks is larger than a specified value (the number of tracks to jump exceeds 128), operation with the system control circuit 24 shifts to step SP5 and the time for moving the thread mechanism is set in the tracking servo 23. Next the system control circuit 24 regulates the tracking servo circuit 23 in step SP6 and after driving the thread mechanism, operation shifts to step SP7. The system control circuit 24 thus regulates operation during large distance track jumps by controlling the thread mechanism drive time.

In contrast, when the track jump is an intermediate distance and the number of tracks to the target track is within the specified range (when the number of tracks in the jump is between 16 and 128), the system control circuit 24 operation proceeds from step SP4 to step SP8 for specifying an intermediate distance track jump in units of multiple tracks. In other words, in step SP8, the system control circuit 24 calculates the integer n nearest the value calculated by dividing the number of tracks to the target track by 16, then in step SP9 specifies track jump by means of this value n. Here, the track jump is made while ignoring the the lower 2 bits of the count value from the traverse counter 26 and based on this count value, the thread mechanism is driven by means of a preset profile matching the integer n values.

When the track jump is a short distance (the number of tracks in the jump is within 1 to 9), the system control circuit 24 operation proceeds from step SP4 to step SP11 and the number of tracks to the target track is set in the reverse counter 26. The system control circuit 24 operation next proceeds to step SP12, the thread mechanism is driven and when the count on the traverse counter 26 reaches zero (0) the thread mechanism is stopped.

Thus, the system control circuit 24 performs track jumps based on the address information. When the figure calculated from this address information for the number of tracks to the target track is zero (0), the system control circuit 24 operation proceeds from step SP4 directly to step SP7.

When the track jump is specified in this way by means of the distance to the target track, the system control circuit 24 then determines in step SP7 whether or not the target address has been reached by means of the address information. When the necessary data have been obtained, the system control circuit 24 returns to step SP2 and upon determining by means of the address information AD that the target address has been reached, proceeds to step SP13.

The system control circuit 24 operation which has proceeded to step SP13 determines if a track is the target track or not by identifying an AB track. Here, the system control circuit 24 regulates the tracking servo 23 to make one track jump in the specified direction and detect changes in the address information AD before and after this one track jump. Further, the track after this one track jump is determined as the target track or not according to the previously mentioned reference standards relating to FIGS. 3 and 4.

In other words, since the system control circuit 24 can identify one track jump to the external circumferential side with a change in address information AD as being a jump from B track to A track; and a track jump to the external circumferential side with no change in address information as being a track jump from the A track to the B track; so that when a one track jump to the external circumference is made with no change in the address information AD, the track before the track jump can be identified as the B track of the target address and further, that inner circumferential side can be identified as the A track of the target address. In addition, when a one track jump is made to the outer circumferential side and the address information AD is not changed, the tracks before and after the one track jump are respectively the A track and B track for the target address.

In the same way, with a track jump to the inner circumferential side and a change in the address information AD, the track before the track jump is identified as the A track for the target address and further, the outer circumferential side is identified as the B track for the target address. Also with a one track jump to the inner circumferential side and no change in the address information AD, the track before and the track after the one track jump will respectively be identified as the B track and A track of the target address.

The system control circuit 24 thus identifies the A B tracks based on changes in the address information and when a positive result is obtained in step SP13, operation moves to step SP14 and the identification process sequence ends.

However when a negative result is obtained in step SP13, the operation proceeds to step SP15, where the target track is identified as being on the inner circumferential side or not by means of AB track identification results and the direction of a one track jump based on these results. Here, when a positive result is obtained, operation of the system control circuit 24 moves to step SP16 and after repeating the one track jump to the inner circumferential side only as many times as needed, the operation moves to step S14 and the identification process sequence ends. Conversely, when a negative result is obtained in step SP15, the system control circuit 24 operation moves to step SP17 and after repeating the one track jump to the outer circumferential side only as many times as needed, operation moves to step SP14 and the identification process sequence ends.

Thus in the above structure, when an access command is input to the optical disk device 10 from an external device while the magneto-optic disc 1 is being rotated, address information matching this access command is detected based on file management data previously acquired from the magneto-optic disc 1. This address information thus detected, allows seek information of the target track to be implemented and recording or playback that matches this access command to be performed. In this seek processing, when the target track is different from the current track, the optical disk device 10 causes the optical pickup 12 to make a track jump only as many times as needed.

Restated, the address decoder 22 of the optical disk device 10 detects the address information AD of the current track by means of the warble signal WB.

When an access command is input from an external device, the optical disk device 10 first calculates a differential address from the address information AD of the current track and the address information of the target track and then calculates the number of tracks to jump by means of this differential address. Track jump is then performed using only this number of tracks.

When there is a large number of track jumps, an optical pickup 12 and demodulation coil 13 are driven, and a sled operated by means of the required movement time. Afterwards, whether or not the track jump was to the target track or not is determined. If the current track is not the target track, the number of tracks is newly calculated from the address information AD and the track jump operation repeated.

When the required number of tracks is an intermediate distance, a count value set in the traverse counter 26 is referred to and the sled driven to perform track jump by using a preset profile in units of 16 tracks. Afterwards, whether or not the track jump was to the target track is determined and if different from the target track, the number of tracks is newly calculated from the address information AD and the track jump operation repeated.

When making repeated track jumps in this way and the number of tracks to jump is 10 to 15 tracks, a track jump profile for 10 tracks is utilized and the sled driven to perform the track jump. Afterwards, whether or not the track jump was to the target track is determined and if different from the target track, the number of tracks is newly calculated from the address information AD and the track jump operation repeated.

Further, when the number of tracks to jump is within 1 to 9 tracks, the sled is driven to perform the track jump based on the count value in the traverse counter 26 in which the number of tracks set in the traverse counter 26 is counted down in sequence while the sled is being driven.

Figure 6A:
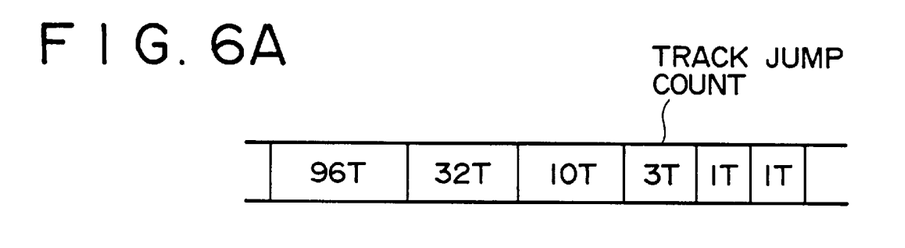
FIGS. 6A and 6B show a timing chart for describing the seek operation.
Figure 6B:
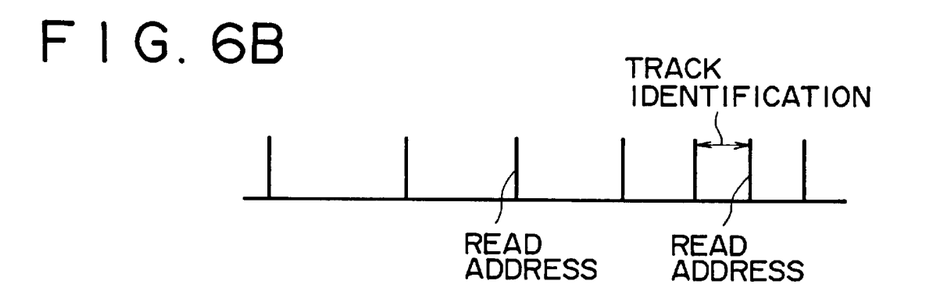

Thus, the optical disk device 10 performs repeated track jumps so that the track jump count lowers in sequence as shown in FIGS. 6A and 6B and by making track jumps within 1 to 9 tracks, the seek process ends at the address information for the target track (FIGS. 6A and 6B).

The optical disk device 10 makes a one track jump to detect changes in the address information change AD and when this address information AD has been changed after a one track jump to the outer circumference; the track before the track jump is identified as the B track with the target address and that inner circumferential side is identified as the A track having the target address. Further when a one track jump is made to the outer circumferential side and there is no change in the address information AD, the tracks before and after the one track jump are respectively identified as the A track with the target address and the B track.

In the same way, when a one track jump is made to the inner circumferential side and there is a change in the address information AD, the track before the one track jump is identified as the A track with the target address and also, that outer circumferential side is identified as the B track with the target address. When there is no change in the address information AD after a one track jump to the inner circumferential side, the tracks before and after the one track jump are respectively identified as the B track with the target address and the A track.

After the optical disk device 10 has made repeated one track jumps to the target A and B track using the identification results described above, the seek process ends and the desired data is recorded on the target track or the desired data is played back from the target track.

The structure of this embodiment therefore allows identification of the A and B tracks by a simple method in which a track is identified by means of a change in the address information when a one track jump has been made. This method also allows access to the desired track.

The above described embodiment described making a one track jump and detecting a change in the address information but this invention is widely adaptable and not limited to one track. For example, the optical disk device 10 may also make a three track jump and detect changes in the address information. If required, the number of track jumps can be made to match a specified number of tracks and the tracks may be identified by means of changes in the address information after the track jump.

Further, the above embodiment described a method in which after seek is performed of the track with the target address, a one track jump was made and a change in the address information detected. However, this invention is not limited to this method and may instead identify a track by means of a change in the address information found during seek operation of the target track. In this way, the time required to perform seek can be shortened by reducing the time for again performing one track jump.

The embodiment as related above, also describes driving the sled by switching to four steps according to the number of track jumps but this invention, which is widely adaptable, is not limited to this particular technique, and if necessary various methods can be employed to drive the sled.

Also in the above related embodiment, a pre-group is made to oscillate to correspond to the inner circumferential side track and the address information recorded but this invention is not limited to this method and is widely adaptable so that the pre-groups can be made to oscillate to correspond to the outer circumferential side track and the address information could be recorded as it would have been on the inner circumferential side track.

The above related embodiment describes recording address information by oscillating (or snaking) the pre-group but this invention is not limited to this method and is widely adaptable so that an address area can be formed at intervals and address information recorded in a bit configuration on this address area or if necessary one address can be commonly shared by adjacent tracks.

Still further, the above related embodiment describes common sharing of address information on a pair of tracks but this invention is not limited to this method and is widely adaptable so that address information can be commonly shared by a plurality of tracks.

Yet still further, the above related embodiment describes an optical disk device of this invention for playback and recording of the desired data on an magneto-optic disc but this invention is not limited to this method and is widely adaptable so that various equipment such as phase change optical disks and various types of optical disk units may be utilized.

The invention as described above can seek the desired data in a simple arrangement wherein a first and a second track having a common address are identified by means of a change in address information when a track jump has been made by a specified number of tracks.

What is claimed is:

1. An apparatus for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one inner circumferential side of the pre-group and shared by at least one outer circumferential track on an outer circumferential side of the pre-group, the apparatus further comprising:

optical head means for tracing a predetermined track and for reproducing data from the disk shaped recording medium;

decoding means for decoding address information included with the reproduced data;

access control means for controlling the optical head when accessing a desired track; and comparison means for comparing an address decoded before accessing and an address decoded after accessing;

judgment means for judging whether the optical head has accessed the desired track.

2. The apparatus according to claim 1, wherein the access control means controls the optical head in order to access a track with the desired address and then controls the optical head in order to access the desired track.

3. The apparatus according to claim 1, wherein the first pre-group has encoded address information.

4. The apparatus according to claim 1, wherein the second pre-group has encoded address information.

5. An apparatus for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the apparatus further comprising:

optical head means for tracing a predetermined track and for reproducing data from the disk shaped recording medium;

decoding means for decoding address information included with the reproduced data;

access control means for controlling the optical head when accessing a desired track;

comparison means for comparing an address decoded before accessing and an address decoded after accessing; and judgment means for judging whether the optical head has accessed the desired track;

wherein address information is encoded on at least one pre-group by forming at least one pre-group to oscillate at varying frequencies and shifting the frequency of the oscillation with respect to a specified frequency.

6. An apparatus for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the apparatus further comprising:

optical head means for tracing a predetermined track and for reproducing data from the disk shaped recording medium;

decoding means for decoding address information included with the reproduced data;

access control means for controlling the optical head when accessing a desired track;

comparison means for comparing an address decoded before accessing and an address decoded after accessing; and judgment means for judging whether the optical head has accessed the desired track;

wherein address information is encoded on at least one pre-group by forming an address area at intervals on at least one pre-group and recording information in a bit configuration on the address area.

7. An apparatus for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the apparatus further comprising:

an optical head for tracing a predetermined track and for reproducing data from the disk shaped recording medium;

a decoder for decoding address information included with the reproduced data;

an access controller for controlling the optical head when accessing a desired track;

a comparing circuit for comparing an address decoded before accessing and an address decoded after accessing; and a decision circuit for judging whether the optical head has accessed the desired track.

8. The apparatus according to claim 7, wherein the access controller controls the optical head in order to access a track with the desired address and then controls the optical head in order to access the desired track.

9. The apparatus according to claim 7, wherein the first pre-group has encoded address information.

10. The apparatus according to claim 7, wherein the second pre-group has encoded address information.

11. An apparatus for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the apparatus further comprising:

an optical head for tracing a predetermined track and for reproducing data from the disk shaped recording medium;

a decoder for decoding address information included with the reproduced data;

an access controller for controlling the optical head when accessing a desired track;

a comparing circuit for comparing an address decoded before accessing and an address decoded after accessing; and a decision circuit for judging whether the optical head has accessed the desired track;

wherein address information is encoded on at least one pre-group by forming at least one pre-group to oscillate at varying frequencies and shifting the frequency of the oscillation with respect to a specified frequency.

12. An apparatus for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the apparatus further comprising:

an optical head for tracing a predetermined track and for reproducing data from the disk shaped recording medium;

a decoder for decoding address information included with the reproduced data;

an access controller for controlling the optical head when accessing a desired track;

a comparing circuit for comparing an address decoded before accessing and an address decoded after accessing; and a decision circuit for judging whether the optical head has accessed the desired track;

wherein address information is encoded on at least one pre-group by forming an address area at intervals on at least one pre-group and recording information in a bit configuration on the address area.

13. A method for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the method comprising the steps of:

using an optical head to reproduce data from the disk shaped recording medium;

decoding address information included with the reproduced data;

controlling the optical head when accessing a desired track;

comparing an address decoded before accessing and an address decoded after accessing; and judging whether the optical head has accessed the desired track.

14. The method according to claim 13, wherein the controlling step comprises controlling the optical head in order to access a track with the desired address and then controlling the optical head in order to access the desired track.

15. The method according to claim 13, wherein the first pre-group has encoded address information which is reproduced in the reproducing step and decoded in the decoding step.

16. The method according to claim 13, wherein the second pre-group has encoded address information which is reproduced in the reproducing step and decoded in the decoding step.

17. A method for recording data on, or reproducing data from, a disk shaped recording medium, wherein the recording medium has a first pre-group, and a second pre-group, wherein at least one of the pre-groups has encoded address information shared by at least one inner circumferential track on an inner circumferential side of the pre-group and shared by at least one outer circumferential track on an outer circumferential side of the pre-group, the method comprising the steps of:

using an optical head to reproduce data from the disk shaped recording medium;

decoding address information included with the reproduced data;

controlling the optical head when accessing a desired track;

comparing an address decoded before accessing and an address decoded after accessing; and judging whether the optical head has accessed the desired track;

wherein address information is encoded on at least one pre-group by forming at least one pre-group to oscillate at varying frequencies and shifting the frequency of the oscillation with respect to a specified frequency, and the encoded address information is reproduced in the reproducing step and decoded in the decoding step.

18. A method for recording data on, or reproducing data from, a disk shaped recording medium, wherein the recording medium has a first pre-group and a second pre-group, wherein at least one of the pre-groups has encoded address information shared by at least one inner circumferential track on an inner circumferential side of the pre-group and shared by at least one outer circumferential track on an outer circumferential side of the pre-group, the method comprising the steps of:

using an optical head to reproduce data from the disk shaped recording medium;

decoding address information included with the reproduced data;

controlling the optical head when accessing a desired track;

comparing an address decoded before accessing and an address decoded after accessing; and judging whether the optical head has accessed the desired track;

wherein address information is encoded on at least one pre-group by forming an address area at intervals on at least one pre-group and recording information in a bit configuration on the address area, and the encoded address information is reproduced in the reproducing step and decoded in the decoding step.

* * * * *